US008682508B2

(12) United States Patent
Bailly et al.

(10) Patent No.: US 8,682,508 B2
(45) Date of Patent: Mar. 25, 2014

(54) METHODS OF IDENTIFYING FLIGHT PROFILES IN AIRCRAFT MAINTENANCE OPERATIONS

(75) Inventors: Carine Bailly, Tournefeuille (FR); Francois Fournier, Roques sur Garonne (FR); Stephanie Peyrat, Toulouse (FR)

(73) Assignee: Thales, Neuilly sur Seine (FR)

( * ) Notice: Subject to any disclaimer, the term of this patent is extended or adjusted under 35 U.S.C. 154(b) by 916 days.

(21) Appl. No.: 12/498,978

(22) Filed: Jul. 7, 2009

(65) Prior Publication Data
US 2010/0010708 A1 Jan. 14, 2010

(30) Foreign Application Priority Data

Jul. 11, 2008 (FR) ...................................... 08 03983

(51) Int. Cl.
*G01C 13/00* (2006.01)
(52) U.S. Cl.
USPC ............ 701/9; 701/31.4; 701/33.4; 701/33.9; 701/34.4
(58) Field of Classification Search
USPC ........... 701/3, 4, 8–10, 14, 29, 35, 29.1, 29.5, 701/31.4, 32.1, 33.4, 33.9, 34.1, 34.4; 702/130, 138, 150, 182–185
See application file for complete search history.

(56) References Cited

U.S. PATENT DOCUMENTS

| 4,470,116 | A | * | 9/1984 | Ratchford | 701/33.4 |
| 4,760,396 | A | * | 7/1988 | Barney et al. | 342/65 |
| 6,023,668 | A | * | 2/2000 | Genoux | 702/187 |
| 2004/0225474 | A1 | * | 11/2004 | Goldfine et al. | 702/183 |
| 2006/0111818 | A1 | * | 5/2006 | Ishii et al. | 701/3 |
| 2006/0155425 | A1 | | 7/2006 | Howlett et al. | |
| 2008/0129459 | A1 | | 6/2008 | Bailly et al. | |
| 2008/0147740 | A1 | | 6/2008 | Bailly et al. | |
| 2008/0215194 | A1 | | 9/2008 | Bailly et al. | |
| 2008/0249678 | A1 | | 10/2008 | Bailly et al. | |
| 2008/0269982 | A1 | | 10/2008 | Bailly et al. | |
| 2008/0304417 | A1 | | 12/2008 | Liu et al. | |
| 2009/0140910 | A1 | | 6/2009 | Bailly et al. | |
| 2009/0306839 | A1 | * | 12/2009 | Youngquist et al. | 701/14 |

FOREIGN PATENT DOCUMENTS

| JP | 2007-249891 | * | 9/2007 |
| WO | WO96/36910 A | | 11/1996 |
| WO | WO2004/066044 A | | 8/2004 |

OTHER PUBLICATIONS

U.S. Appl. No. 12/465,248, filed May 13, 2009.
U.S. Appl. No. 12/437,166, filed May 7, 2009.

* cited by examiner

*Primary Examiner* — Thomas Black
*Assistant Examiner* — Ce Li
(74) *Attorney, Agent, or Firm* — LaRiviere, Grubman & Payne, LLP

(57) ABSTRACT

The method of identifying a flight profile of an aircraft, the aircraft including a centralized maintenance system and an item of equipment including a component designed to measure the environmental conditions, comprises:
a first step of collecting data measured by a sensor of the component;
a second step of comparing values measured by at least one sensor with predefined threshold values so as to store in a resource the values that exceed the threshold values;
a third step of comparing at least one set of stored values with at least one predefined flight profile, a flight profile representing a trend of values measured by a sensor according to at least one item of information defining a flight context;
a fourth step of identifying the flight profile that is closest to the set of values stored for a sensor.

17 Claims, 2 Drawing Sheets

METHODS OF IDENTIFYING FLIGHT PROFILES IN AIRCRAFT MAINTENANCE OPERATIONS

PRIORITY CLAIM

Figure 1:
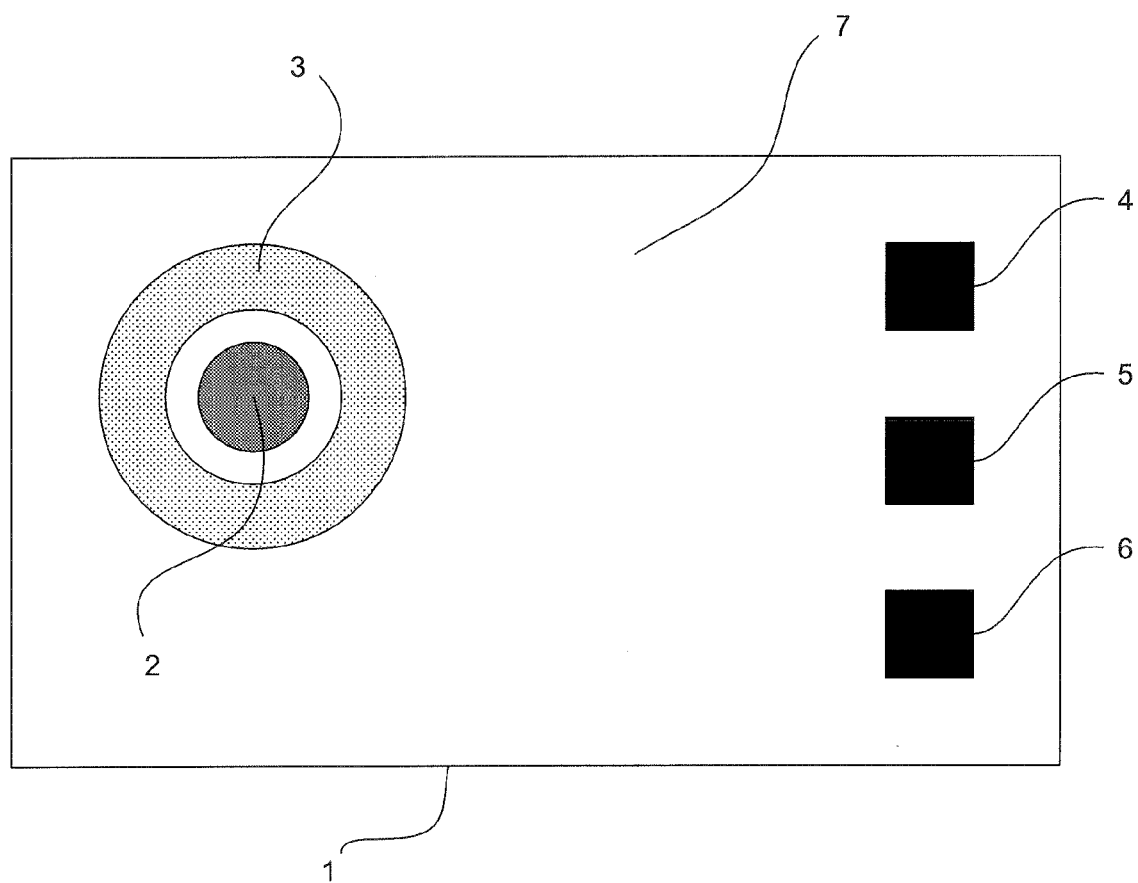

This application claims priority to French Patent Application Number 08 03983, entitled Methods of Identifying Flight Profiles in Aircraft Maintenance Operations, filed on Jul. 11, 2008.

TECHNICAL FIELD

The present invention relates to the field of maintenance devices for aircraft, and more particularly the field of improvements in the prevention of onboard computer failures. More specifically, the invention deals with maintenance operations when drafting failure reports.

BACKGROUND OF THE INVENTION

Generally, in aircraft, the failure reports of an aircraft aim to establish, in a centralized manner or, more specifically, on an item of equipment, a statement of the failures or anomalies arising in a flight context, such as external conditions (temperature, pressure, altitude) or data specific to an item of equipment or to a plurality of items of equipment.

In general, the failures of the various items of equipment are diagnosed and stored by test functions available in each item of equipment.

In aeronautics in particular, some items of equipment have a so-called built-in test equipment (BITE) function. This function is used to establish diagnoses and communicate them to a centralized maintenance system of the aircraft comprising a centralized computer. The centralized computer can notably be a computer known as a centralized fault display interface unit (CFDIU) or, alternatively, central maintenance computer (CMC).

The centralized computer is responsible for establishing the summary of the failures for the entire aircraft and providing an interface for a post-diagnosis for maintenance operators.

To this end, the centralized computer drafts a post-flight report (PFR). This report comprises the summary of the failure messages or alarms transmitted by the various items of equipment or systems in the aircraft. These failure messages or alarms are generally associated with a certain quantity of data such as the date, the time, the flight phase for example.

Based on this report, the maintenance operator decides to remove the items of equipment that need a repair or to investigate further or to keep the item of equipment in its environment.

One drawback of current failure reports, regarding items of equipment that require further investigation, is that they do not include contextual information, notably as to their use or their environment upon the detection and sending of alarms or failure messages.

The a posteriori diagnoses or analyses are thus generally limited and do not make it possible to correctly analyse the causality links underlying the occurrence of failures during flight.

SUMMARY OF THE INVENTION

The invention provides a way of resolving the abovementioned drawbacks and notably of taking into consideration, in the drafting of the failure reports, contextual information at the time of the occurrence of equipment failures.

The invention notably enables a centralized computer to correlate predefined flight profiles concerning the behaviour of at least one item of equipment with values measured by sensors of said item of equipment during flight. The computer can then be used to associate the "closest" predefined flight profile with the values measured on drafting a failure report.

Advantageously, the method of identifying a flight profile for an item of equipment including a component designed to measure environmental conditions comprises:

a first step of measuring and collecting data measured by at least one sensor of the component;

a second step of comparing, using a computation resource of the component, values measured by at least one sensor with predefined threshold values so as to store in a storage device the values that exceed the threshold values;

a third step of comparing at least one set of values stored in step 2 with at least one predefined flight profile, a flight profile representing a trend of values measured by a sensor according to at least one item of information defining a flight context, each predefined flight profile including an identifier;

a fourth step of identifying the flight profile that is closest to the set of values stored for a sensor, the flight profile being called "reference flight profile";

a fifth step of transmitting, by a transmission/reception device, at least one identifier of a reference flight profile, identified in the preceding step, to the centralized maintenance system.

Advantageously, the first step can comprise:

the measurement of temperature data by a sensor; and/or the measurement of relative humidity data by a sensor; and/or the measurement of mechanical vibration data by a sensor; and/or the measurement of mechanical deformation data by a sensor; and/or the measurement of data concerning the number of SEU/MEU received by a sensor, SEU and MEU respectively standing for "single event upset" and "multiple event upset", representing damage caused by one or more isolated particles.

Advantageously, the second step comprises at least one threshold value defining a maximum and/or a second threshold value defining a minimum.

Advantageously, the second step comprises the definition of a curve defining the threshold values that is roughly of the same form as the trend of the altitude.

Advantageously, the storage of the data processed in the second step is backed up by an RFID component.

Advantageously, the third step comprises:

the definition of a flight context by an item of information identifying the type of aircraft; and/or the definition of a flight context by an item of information identifying the flight plan; and/or the definition of a flight context by a set of data defining the trend of the altitude of the aircraft in a flight; and/or the definition of a flight context by an item of information identifying the positioning of the item of equipment in the aircraft; and/or the definition of a flight context by at least one item of information identifying the usage mode of the item of equipment, the usage mode of the item of equipment being defined by the set of actions carried out on said item of equipment.

Advantageously, the fifth step is carried out by a transmission/reception device comprising a transceiver sending and receiving information by electromagnetic channel or by a transmission/reception device comprising an electrical component sending and receiving by wired channel.

Advantageously, the centralized maintenance system comprises a centralized maintenance computer making it possible to identify the reference flight profiles received from at least one component of an item of equipment.

Advantageously, the centralized maintenance computer generates a failure report for each of the items of equipment by recording the identified reference flight profiles of the item of equipment.

BRIEF DESCRIPTION OF THE INVENTION

Figure 2:
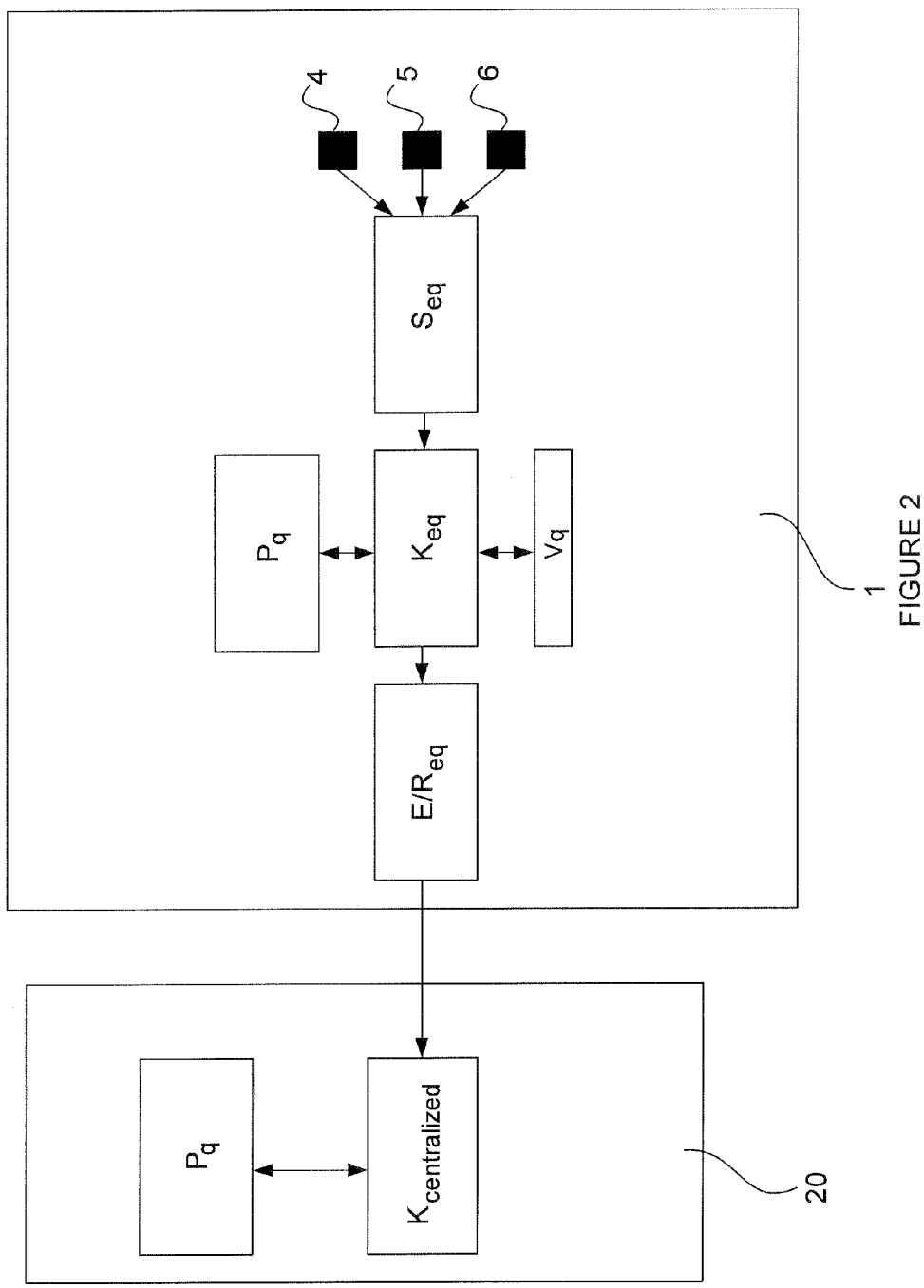

Other features and benefits of the invention will become apparent from the description that follows, given in light of the appended drawings which represent:

FIG. 1: an aeronautical item of equipment comprising sensors, a storage resource and measured data transmission means;

FIG. 2: a diagram of the data collected by the items of equipment and transmitted to the centralized maintenance system.

DETAILED DESCRIPTION OF THE INVENTION

FIG. 1 represents an electronic component 1 designed to be positioned on the surface of an aeronautical item of equipment. This electronic component primarily comprises sensors 4, 5, 6 measuring environmental information such as:
  temperature,
  pressure,
  relative humidity,
  mechanical deformations,
  the number of SEU (single event upsets) received or the number of MEU (multiple event upsets) received, representing the damage caused by one or more isolated particles; or alternatively
  the vibrations recorded by the item of equipment.

Moreover, the component 1 comprises a surface battery 7 and an assembly 2 comprising a microprocessor and a memory powered by the battery 7. The microprocessor is used to perform a certain number of operations on the data measured by the sensors and the memory provides a temporary storage for the predefined data required for the calculations of the microprocessor and for the data generated on completion of the calculations by the microprocessor.

An antenna 3 is designed to transmit data to the centralized maintenance system.

In a preferred embodiment, this component can be a chip, such as an RFID-technology chip according to the terminology used in aeronautics.

In other embodiments, the component can be passive and be powered directly by the item of equipment or by an external battery or alternatively by electromagnetic waves originating from a centralized source.

The means of transmitting data to the centralized maintenance system can be electrical, with transmission in this case performed by wired channel, or can be electromechanical, with transmission in this case performed by the transmission of electromagnetic waves.

Moreover, in another embodiment, the storage resource or the memory storing the data measured by the sensors and/or the data calculated by the microprocessor of the component can be a storage resource of the item of equipment that includes the component.

The centralized maintenance system of an aircraft receives the data from the components of each item of equipment of the aircraft that includes at least one component and that is recognized by the centralized maintenance system.

The data from each component are sent upon request from an electrical or electromagnetic transmitter of the centralized maintenance system that is used to interrogate the processor of the component.

For each component of an item of equipment, the invention makes it possible to predefine:
  first, a set of threshold values for each sensor, stored in the memory of the component, beyond which the data measured by a sensor are stored in the memory of the component;
  second, flight profiles defined by at least one set of data from a sensor corresponding to a predefined flight context.

For a given item of equipment, a flight context can be defined by:
a type of equipment;
a positioning of the equipment in the aircraft;
a usage mode, that is, all the actions carried out on the equipment during a flight;
an altitude variation profile;
a known flight plan;
polar crossings.

The centralized maintenance system and the component include a certain number of known flight profiles that can be, for example and in a non-limiting way:
the trend of the temperature of an item of equipment according to a certain number of known flight plans;
the trend of the pressure of an item of equipment on crossing the poles;
the trend of the mechanical vibrations of an item of equipment according to the variation in altitude for different altitude variation curves;
the trend of the relative humidity of an item of equipment according to different positions of the item of equipment in the aircraft;
the trend of the number of SEU/MEU received according to the altitude variation for different altitude variation curves and on crossing the poles.

The invention thus makes it possible to compare the values measured beyond predefined thresholds of each sensor with predefined flight profiles, so as to identify the flight profile for which the set of data is closest to the values measured by each sensor. The flight profile that most closely corresponds to the measured values is called the "reference flight profile".

Flight profiles are therefore predefined for each of the sensors.

The identification of a set of reference flight profiles for the set of sensors makes it possible to identify the flight context of the item of equipment.

A reference flight profile for a sensor makes it possible to identify the configuration of the in-flight operation of an item of equipment for a sensor.

The set of reference flight profiles for a set of sensors of an item of equipment can be used to identify the in-flight configuration of an item of equipment.

The benefit of such a solution is that, when sending data from the component to the centralized maintenance system, just the reference flight profiles that correspond to the measured values are sufficient for the analysis of a failure report correlated with the flight context.

The sending of the reference flight profiles can entail sending an identifier of the reference flight profile for which the centralized maintenance system includes the list of the identifiers of the predefined flight profiles. In this case, a simple comparison of the identifiers provides a way of ascertaining the reference flight profiles of each component of an item of equipment.

Each failure report concerning an item of equipment is then associated with as many reference flight profiles as there are sensors included in the equipment.

The microprocessor or the computation resource of the component analyses each datum processed by a sensor and then compares it with predefined threshold values.

Each measurement that exceeds a threshold value is stored by the component of an item of equipment. For example, for an item of equipment, the temperature sensor of the component can, at each instant, measure the temperature of the item of equipment and the component can record all the temperatures that exceed 45° C.

The threshold values can be adjusted so that a sufficient quantity of data is stored in order to be analysed.

FIG. 2 illustrates the routing of the data measured by the sensors 4, 5, 6 to the centralized maintenance system 20. The component comprises a sensor manager $S_{eq}$ which is used to recover the data measured by the sensors.

The recovered data are then processed by the computer $K_{eq}$ of the component in order to be compared with threshold values $V_q$. The values that exceed the threshold $V_q$ according to the sensors are stored in a storage resource.

Upon a request from the centralized maintenance system to the transceiver $E/R_{eq}$ of the component to recover the data, the computer $K_{eq}$ of the component can compare the set of data recovered and compared with the threshold values with flight profiles $P_q$ so as to identify the reference flight profile for the sensor.

The identifier of the reference flight profile is then sent by the transmitter $E/R_{eq}$ to the centralized maintenance system, and notably to the computer $K_{centralized}$ of the centralized maintenance system.

The latter is capable of comparing the received identifiers with the flight profiles $P_q$ prerecorded in a storage resource of the centralized maintenance system in order, conversely, to identify the flight context.

The reference flight profiles identified by the centralized maintenance computer are then recorded in a failure report for the item of equipment. The failure report accessible to an operator in a post-flight operation can then be supplemented with information defining the flight context.

The benefit of such a solution is that it does away with a large quantity of data processed during a flight by recording only a portion of the data so as to find a flight context.

One of the objectives of the sensors is to indicate the anomalies of an item of equipment. The invention provides a way of combining a second object, which is to indicate a certain number of values exceeding a threshold, so as to identify a flight profile which can be used when analysing a failure report to identify the flight context.

This solution provides a way of more broadly analysing the errors or sporadic anomalies affecting an item of equipment that cannot be taken independently of the flight context.

What is claimed is:

1. Method of identifying a flight profile of an aircraft, the aircraft including a centralized maintenance system and equipment including a component designed to measure the environmental conditions at or near critical equipment aboard the aircraft, the flight profile being a trend of values recorded from environmental sensors comprising a mechanical vibration sensor or a mechanical deformation sensor, on the aircraft during a particular flight, the environmental sensor having associated therewith a flight context, which is a data set recording one or more items relating to the particular flight, including but not limited to type of aircraft, flight plan for the particular flight, and trend of altitude values for the particular flight; wherein the method comprises:
   a. a first step of collecting environmental data from the environmental sensor of the component, the environmental data collected comprising measurements from the immediate vicinity of the component, the component being attached to or near critical equipment aboard the aircraft, the environmental data collected comprising mechanical vibration data or mechanical deformation data;
   b. a second step of comparing, using a computation resource of the component, values measured by the environmental sensor with predefined threshold values so as to store in a storage device the values that exceed the threshold values, the second step further comprising the definition of a curve defining the threshold values that is roughly of the same form as the trend of the altitude;
   c. a third step of comparing at least one set of values stored in the second step with the equivalent set of values stored in at least one predefined reference flight profile that includes an identifier, a flight profile representing a trend of values measured by the environmental sensor according to at least one item of information defining the flight context, each predefined flight profile including an identifier;
   d. a fourth step of identifying the reference flight profile that is closest to the set of values stored for the environmental sensor selected in the second step; and,
   e. a fifth step of transmitting, by a transmission/reception device, at least one identifier of the reference flight profile, identified in the fourth step, to the centralized maintenance system.

2. The method of claim 1, wherein the environmental sensor further comprises a temperature sensor, and the environmental data comprises temperature data.

3. The method of claim 1, wherein the environmental sensor further comprises a relative humidity sensor, and the environmental data comprises relative humidity data.

4. The method of claim 1, wherein the environmental sensor further comprises a pressure sensor, and the environmental data comprises pressure data.

5. The method of claim 1, wherein the first step further comprises the measurement of data concerning the number of SEU/MEU received by the environmental sensor, SEU and MEU respectively standing for "single event upset" and "multiple event upset", representing damage caused by one or more isolated particles.

6. The method of claim 1, wherein the second step further comprises at least one threshold value defining a maximum.

7. The method of claim 1, wherein the second step further comprises at least one threshold value defining a minimum.

8. The method of claim 1, wherein the storage of the data processed in the second step is backed up by an RFID component.

9. The method of claim 1, wherein the third step further comprises the definition of a flight context by an item of information identifying the type of aircraft.

10. The method of claim 1, wherein the third step further comprises the definition of a flight context by an item of information identifying the flight plan.

11. The method of claim 1, wherein the third step further comprises the definition of a flight context by a set of data defining the trend of the altitude of the aircraft in a flight.

12. The method of claim 1, wherein the third step further comprises defining the flight context as an item of information identifying the positioning of the item of equipment in the aircraft.

13. The method of claim 1, wherein the third step further comprises the definition of a flight context by at least one item of information identifying the usage mode of the item of equipment, the usage mode of the item of equipment being defined by the set of actions carried out on said item of equipment.

14. The method of claim 1, wherein the fifth step is carried out by a transmission/reception device comprising a transceiver sending and receiving information by electromagnetic channel.

15. The method of claim 1, wherein the fifth step is carried out by a transmission/reception device comprising an electrical component sending and receiving by wired channel.

16. The method of claim 1, wherein the centralized maintenance system comprises a centralized maintenance computer making it possible to identify the reference flight profiles received from at least one component of an item of equipment.

17. The method of claim 16, wherein a failure report for each of the items of equipment is generated via the centralized maintenance computer by recording the identified reference flight profiles of the item of equipment.

* * * * *